April 20, 1937.                F. A. HUG                    2,077,523
              APPARATUS FOR CALCULATING TRIGONOMETRIC PROBLEMS
                       Filed April 27, 1934        4 Sheets-Sheet 1
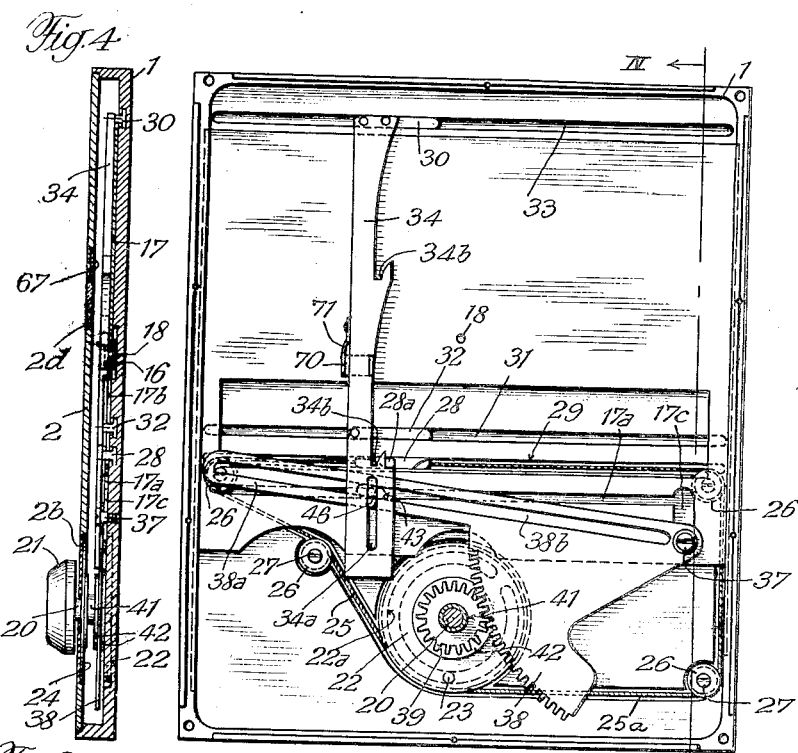
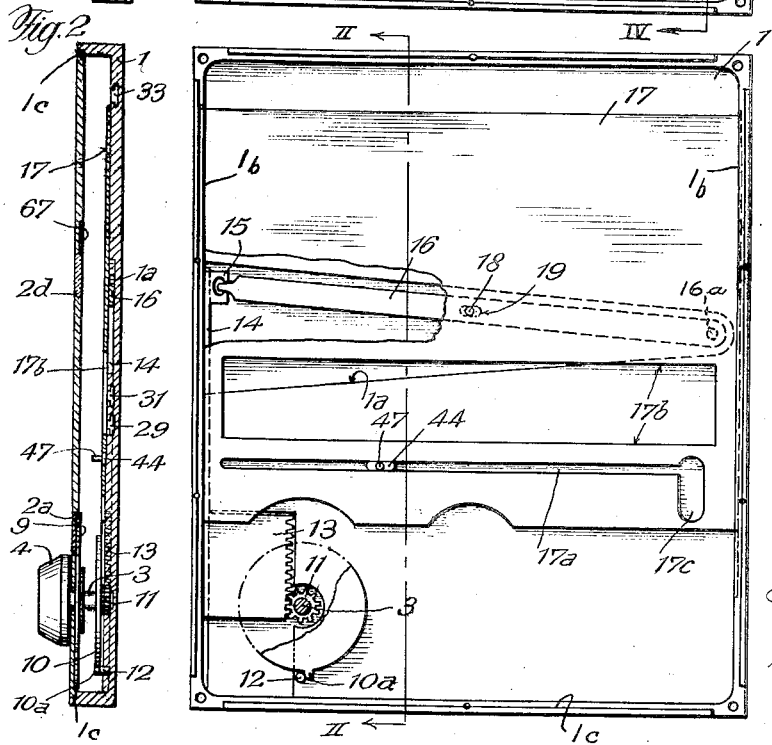
Inventor:
Fritz A. Hug
By
Sommers & Young
Attys.

April 20, 1937.  F. A. HUG  2,077,523
APPARATUS FOR CALCULATING TRIGONOMETRIC PROBLEMS
Filed April 27, 1934  4 Sheets-Sheet 2
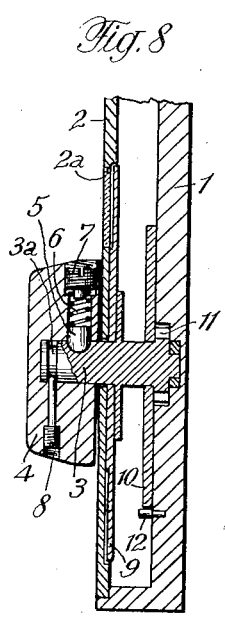
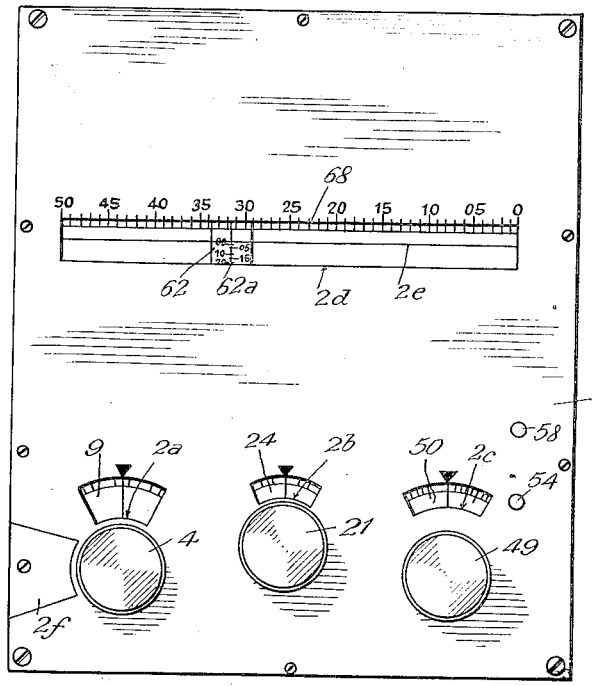
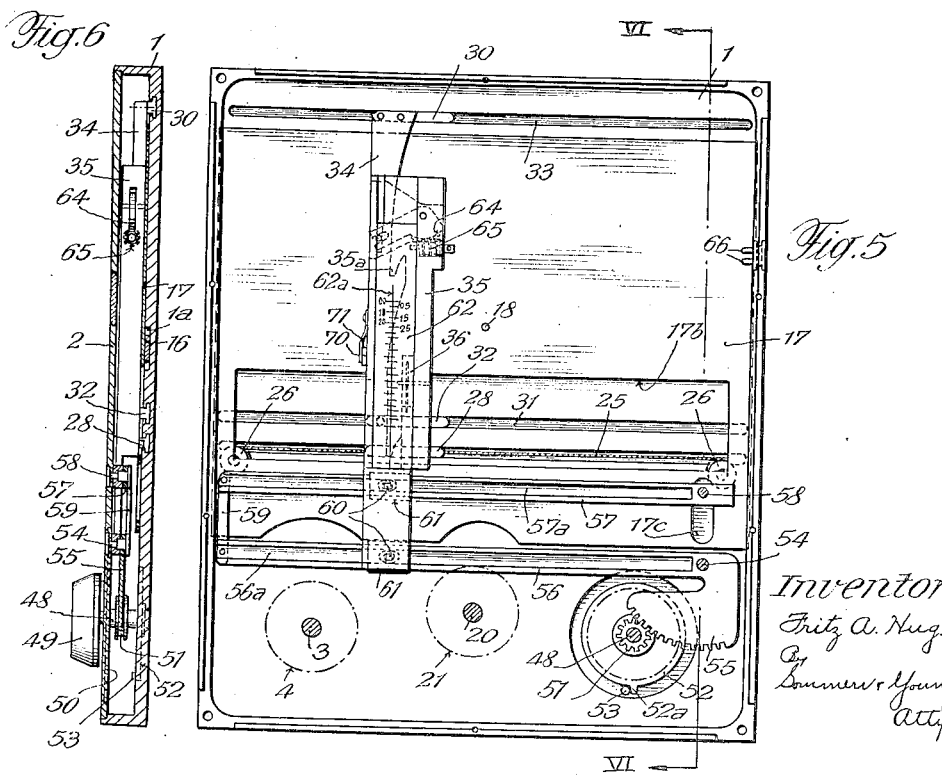

April 20, 1937.   F. A. HUG   2,077,523
APPARATUS FOR CALCULATING TRIGONOMETRIC PROBLEMS
Filed April 27, 1934   4 Sheets-Sheet 3
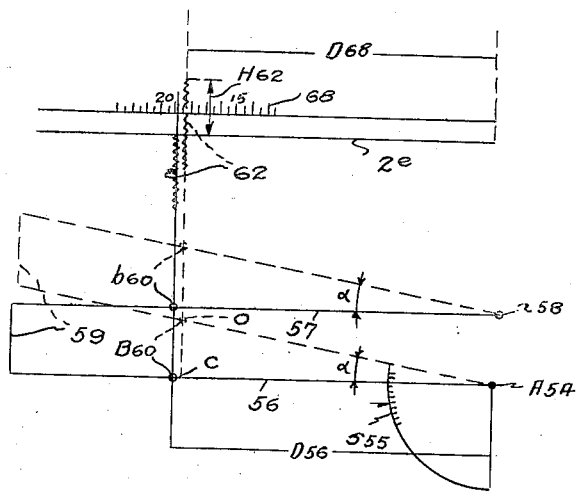
Fig. 21
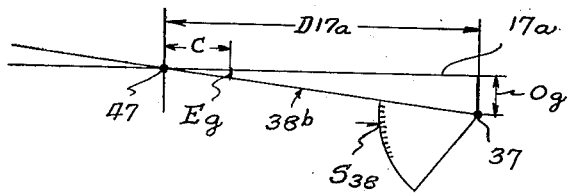
Fig. 22
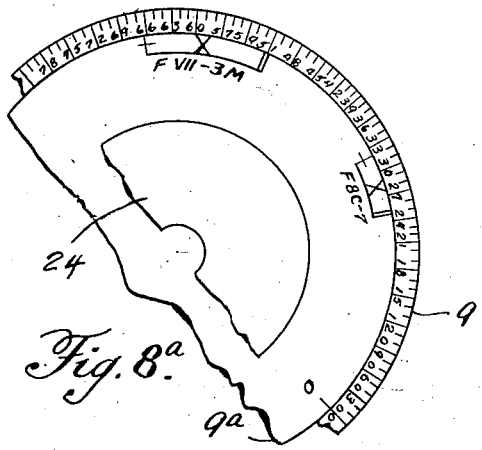
Fig. 8ª
Inventor:
Fritz A. Hug.
By Sommers & Young
Attys.

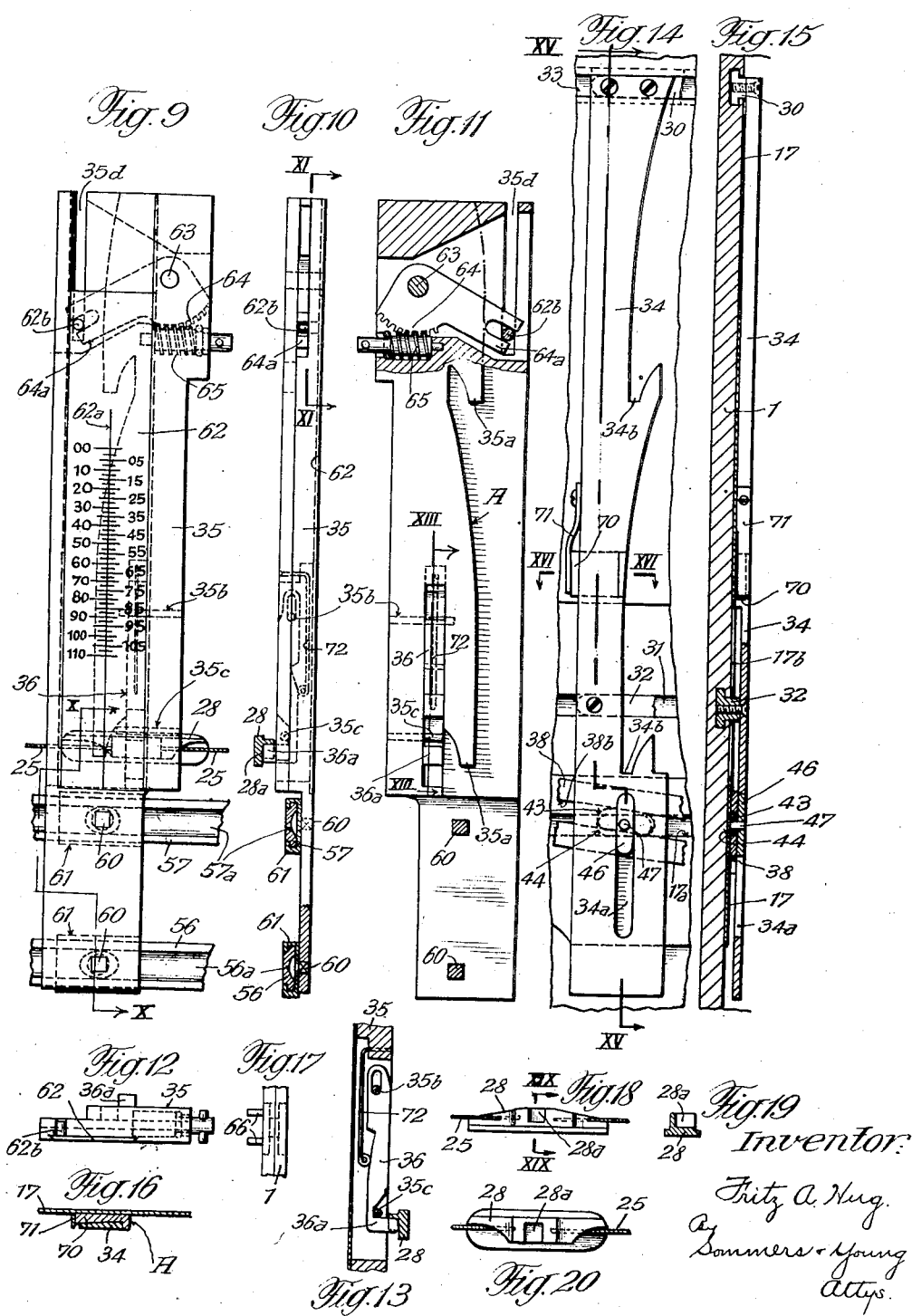

Patented Apr. 20, 1937

2,077,523

UNITED STATES PATENT OFFICE 2,077,523

APPARATUS FOR CALCULATING TRIGONOMETRIC PROBLEMS

Fritz A. Hug, Berkeley, Calif.

Application April 27, 1934, Serial No. 722,773
In Switzerland May 6, 1933

19 Claims. (Cl. 235—61)

The invention relates to an apparatus for mechanical execution of trigonometric functions, particularly for ascertainment of measurements of horizontal distance, altitude and inclined distance of an object from a point of observation as surveyed by means of a theodolite.

In this calculating apparatus according to the invention, the data derived by surveying, by means of an observation instrument (theodolite), which data is herein named: appearing size, vertical angle and the known actual size are utilized. This data is explained in another part of this specification. An instrument suitable for obtaining the necessary data is described in my co-pending application, Serial No. 721,608, filed April 20, 1934, for "Aircraft and artillery observation instrument". This is made possible, in that the apparatus contains means for adjusting, by means of which the relation between the known actual size of the object and the appearing size measured with comparative-units, is established and denotes the inclined distance. By setting the relative numbers the resulting distance which figures as the hypothenuse of an imaginary right-angled triangle "eyepoint-object-plumb to the eye-level" can be read off directly. There are further means to set the visual angle on the apparatus, so that the dimensions of the two sides (horizontal distance and altitude) can be read off.

The accompanying drawings illustrate one constructional form of this invention by way of example only, in which:

Fig. 1 is a view of the opened casing of the apparatus with some of the parts removed showing the mechanism which is set in accordance with the known actual size of the object;

Fig. 2 is a cross-section on the line II—II of Fig. 1 near the dial-knob with the casing cover in place;

Fig. 3 is a plan of the device with the casing cover removed showing the mechanism for setting the relations between appearing size and comparative unit, the mechanism set according to the known size of the object being omitted for the sake of clarity;

Fig. 4 is a perpendicular cross-section on the line IV—IV of Fig. 3 with the casing cover in place;

Fig. 5 is a plan view of the open casing with the mechanism for setting the visual angle and utilizing the motions of the parts illustrated in Figs. 1 and 3, some of the other mechanism being omitted for the sake of clarity;

Fig. 6 is a perpendicular cross-section on the line VI—VI of Fig. 5 with the casing cover in place;

Fig. 7 shows a plan of the casing cover;

Fig. 8 is a vertical cross section on one of the dial knobs.

Fig. 8a is a plan view of the denomination ring with part of the dial disc in which it lies shown;

Fig. 9 is a front elevation of the "sides-indicator" with subordinate parts; and Fig. 10 is a side view of Fig. 9 partly in section on line X—X;

Fig. 11 is a rear-view in partial cross-section on the line XI—XI (Fig. 10),

Fig. 12 shows an end-view of the same, and

Fig. 13 shows a cross-section on the line XIII—XIII (in Fig. 11).

Fig. 14 shows a front elevation of the guide bar;

Fig. 15 is a side elevation thereof in partial perpendicular cross-section on the line XV—XV in Fig. 14;

Fig. 16 is a horizontal cross-section on the line XVI—XVI of Fig. 14;

Fig. 17 shows a front view of a detail;

Fig. 18 is a front elevation of the driver;

Fig. 19 is a cross-section thereof on the line XIX—XIX of Fig. 18, and

Fig. 20 is a plan of the same.

Figs. 21 and 22 show diagrams of the principle on which the apparatus is based.

The whole mechanism is enclosed in a flat, rectangular casing 1, which has a cover 2 having scale-slots 2a, 2b, 2c and 2d (Fig 7). Mounted on the axis 3 which protrudes through cover 2 is a dial-knob 4, which is safeguarded against turning completely around by its construction shown in Fig. 8. Axis 3, which is supported at the bottom of the casing 1, possesses a dial-disk 9 fixed thereon, a stop (Fig. 1) 10a of the stop-disk 10, the motion of which is limited by stop-pin 12, which is screwed into the bottom of casing 1, Fig. 1. Knob 4 is mounted on the outer end of axis 3 by means of a pin 8, the inner end of which extends into annular groove 3a in axis 3. Knob 4 is yieldingly prevented from turning on axis 3 by the rounded end of pin 5 which is pressed into a recess in the axis 3 by spring 6 and screw 7. When the knob 4 is turned until stop 10a (Figs. 1 and 2) comes to rest against stop pin 12, and then the turning of the knob is forcibly continued, the ball-shaped end of pin 5 will be forced out of the recess of axis 3, and the knob will turn on axis 3 without transmitting its motion to the mechanism with which it is connected, thus preventing damage to the mechanism of the apparatus. Screw 8 extending into ring groove 3a merely keeps the knob from being pulled off. The dial 9 is partly visible through a sector-like aperture 2a (Figs. 2 and 7) of the cover 2. Pinion 11 meshes with a rack 13, which is integral with the rod 14 guided in a groove 14a along the side of casing 1, which rod possesses at its upper end a socket 15, which accommodates the free end of an arm 16, the other end of which is supported on a pivot 16a set into the bottom of the casing 1 (Figs. 1 and 2). Arm 16 rests in a recess 1a affording room for the motion of the arm. On the bottom of the casing rests a plate 17 with a transmitter pin 18 riveted into it and protruding into a slot 19 of arm 16. Plate 17 is guided in longitudinally extending slots 1b cut into the sidewalls of the casing 1 and is provided with a transverse guide slot 17a in which a glider 44 is slidably received. Above this transverse guide-slot, plate 17 has a rectangular opening 17b extending almost over the whole width of the plate.

In the same manner as dial-knob 4 is fastened to axis 3, dial-knob 21 is fastened to axis 20, which is of one piece with a cord drum 22, having a concentric groove 22a, in which stop-pin 23, which is screwed in the bottom of the casing, is received, thus limiting the motion of the cord drum. Slung around the cord drum 22 is a string or wire-cord 25, which in one place is fastened at the periphery of the drum and runs in grooves 25a in the casing-bottom and is guided by guide-rolls 26, which are held rotatably by screws 27 on the bottom of the casing. Both ends of cord 26 are united in driver 28, which is guided in a ⊥-shaped slot 29 in the bottom of the casing. This driver 28 (Figs. 18 to 20) has a recess 28a Guide bar 34 is fastened to guide-pieces 30 and 32 sliding in transversely extending slots 33 and 31 in the bottom of the casing which are similar in shape to slot 29. Interlocking with guide bar 34 is the sides-indicator scale bar 35 (Fig. 5) which, as is described more explicitly in the following, is equipped with a pawl-lever 36, which with its nose 36a catches in the recess 28a of driver 28 (Fig. 13) and thereby secures the connection between guide bar 34 and sides-indicator 35.

Plate 17 is provided with a slot 17c in which, without hindering the plate in its longitudinal motion, pivot bolt 37 is received, which is seated in the bottom of the casing. On pivot bolt 37 swings gear-sector 38, meshing with pinion 39, which together with dial-disk 24 is fixed to bushing 41 rotatable on axis 20. The toothed part of the sector 38 is guided between two washers 42. Dial 24 is visible through a sector-like opening 2b in cover 2. The gear sector is of one piece with an indicator arm 38a comprising a longitudinal slot 38b which extends nearly up to the bolt 37. In this slot a glider 43 is guided; a second glider 44 (Figs. 15 and 1) being guided in a transverse guide-slot 17a of plate 17 and a third glider 46 is guided in a longitudinal slot 34a of guide bar 34. All three gliders have a common pivot-axis 47, whereby the guide bar 34, the gear sector 38 with arm 38a and plate 17 are operatively connected. The gliders 44 and 46 are fixed stationary with, and at a right angle to each other on axis 47, while glider 43 is loose on axis 47 between the other two gliders.

Supported on the bottom of the casing 1 is a third axis 48 with a dial-knob 49 attached in the same way as is the case with the two other axes. Fast with this axis 48 are a dial 50, a pinion 51 and a stop 52a on a stop-disk 52, the motion of which is limited by stop-pin 53. Supported to swing on a bolt 54, which is attached to the cover 2 is a gear-sector 55, meshing with pinion 51, and which sector is of one piece with the so-called parallelogram arm 56 extending transversely over the casing 1 and having a concave-groove 56a. A second parallelogram arm 57 is likewise supported (as arm 56) on the cover on a bolt 58 and is of the same cross-section, the free end of both arms being connected by a link 59. Fastened to the sides-indicator scale bar 35 by means of two rivets 60 are two spring-gliders 61, which grip the two parallelogram arms 56 and 57 and which with rivet heads of oval plan are slidable in the longitudinal concave grooves 56a and 57a of the arms 56 and 57 (Figs. 9 and 10) thus connecting the sides-indicator 35 with the two paralleologram arms. The rivet-heads are arranged in a manner, that the transverse axes of the oval rivet-heads run parallel with the longitudinal axis of the parallelogram arms 56 and 57. As soon as through turning of the dial-knob 49 the two parallellogram arms are swung, thus changing the right angular position to the sides indicator scale bar, the two rivet-heads take a different position in relation to the concave grooves of the parallelogram arms thus tightening the grip of the spring-gliders 61 on the arms 56 and 57.

The two hooks of the sides indicator scale bar 35a are aligned with each other and interlock with notches 34b of guide bar 34 (Figs. 9—15). Through the transmitted turning motion of dial-knob 49 the hooks 35a disengage from the notches 34b, whereby at first, pawl-lever 36, moving in a longitudinal slot 35e of the sides-indicator scale bar 35, catches with its nose 36a in the recess 28a of the driver 28. By further movement of the sides-indicator scale bar 35, the pin 35c by pressing on the cam surface 36a, causes pawl-lever 36, which latter is guided and journaled by means of its slot and a pin 35b, to be lifted completely off of the driver 28. The pins 35b and 35c are set into the sides indicator in such manner as to span the longitudinal slot 35e of the sides indicator 35. When the sides-indicator scale bar is returned to its primary position the pawl-lever 36 pushes with its nose against guide bar 34, is pressed down by spring 72 and snaps with its nose 36a into its position of rest in the recess 28a of driver 28. When the driver 28 is moved from its catch position by turning the knob 21, while the pawl lever 36 is disengaged from the driver, and then pawl lever 36 is returned to its primary position, the nose of the pawl-lever drops into ⊥-shaped slot 29. By turning the knob in the reverse direction, the cam surface 28b of driver 28 thus being slid under the pawl-lever 36 lifts the latter, which, depressed by spring 72 finally snaps with its nose 36a back into the recess 28a of the driver.

The sides indicator 35 possesses a dovetailed guide-groove 62c (Figs. 9, 10 and 12) to receive an adjustable scale-ruler 62 having a graduation for height inscribed thereon. To adjust this graduation a worm-gear-sector 64 is arranged movably on pivot 63 of sides-indicator 35, which sector is meshed with a worm 65. The gear sector 64 is provided with a fork 64a adapted to receive the pin 62b of the scale-ruler 62. By setting all dials on "zero" the sides-indicator is moved to the extreme right and the axis of worm 65 interlocks with keydrum 66 (Figs. 5 and 17) resting in the right wall of the casing 1, and actuated by a key from the outside.

The cover 2, as shown in Fig. 7 sits in recesses 1c of the casing-walls and is fastened to the casing by screws. The dial disk 9 actuated by the dial-knob 4 (Figs. 2, 7 and 8) is received in a recess of the cover 2 and has itself a recess in which exchangeable denomination-rings 9a are put. The dial possesses also a graduation on its outer edge which serves to set the dial in confirmation with data for the actual size (measurement in feet) of the object figuring in the calculation. Cover 2 has an opening covered by a slide 2f or similar means, for quick exchange of the denomination-rings 9a. The dial 24 is graduated as to "appearing size units" and dial 50 carries a graduation as to the visual vertical angle. The three sector-like apertures 2a, 2b, and 2c, making possible the reading of the dials, are closed with transparent celluloid- or glass-windows on which an index mark or lines are inscribed. The rectangular reading-window 2d is set into cover 2 and held in place by a gib 67. On this window a graduation 68 for the distance (e. g. 1 to 50 kilometers) and a longitudinal index line 2e over which the height is read off of scale-ruler 62. The height-graduation 62, visible through reading-window 2d has a center index line 62a. The distance is read off of graduation 68 of window 2d where the index line 62a intersects graduation 68.

To illustrate how the calculating apparatus described in the foregoing works, the following example is given: An aircraft of the type "Fokker F–VII–3M" is sighted and ranged at by means of a special theodolite. The horizontal distance from the point of observation and the altitude of the plane have to be determined. The plane is flying in a transverse direction to the observation station and has a fuselage length of 49.21 feet.

As seen in Fig. 8a the dimensions which are wingspread (marked +), crossprojection (marked ×) and fuselage length (marked ||) of the plane are indexed on the denomination ring 9a, which is inserted in the dial 9 so that the index marks coincide with the corresponding measures as indicated on the graduations on the outer edge of the dial 9. Therefore, the designation for fuselage of this type of plane must coincide with 49.21 feet on the just mentioned scale.

By turning the knob 4, the dial 9 is brought into position so that the designation "F–VII–3M, fuselage" coincides with the index line on the glass covering the sector-like aperture 2a. The turning motion of the knob is transmitted by parts 3, 11, 13, 14, 15, 16 and 18 to the plate 17, thereby bringing the slot 17a into position in relation with pivot point 37, thus establishing the distance denoting the size of object Og (see diagram Fig. 22).

The appearing size Eg assumably being 0.5 0/00 is read off of the collimation plate of the theodolite optic.

This size given in 0/00 (one per thousand) is relative to the angle formed by two imaginary lines drawn from the point of view to the extremities of the plane as it is seen in air space. A smaller craft would have to be accordingly nearer the observation point to have the same appearing size (0.5 0/00) i. e. to form the same angle. However, this data is given as appearing size, because this term is better understandable among laymen than angle denominations. The apparent mistake caused by the right angular arrangement of the size of object Og with one of the above-mentioned imaginary lines represented by the line 17a (Fig. 22) is always proportional with the angle enclosed by the lines 17a and 38b, and is compensated for in the arrangement of the graduations of the scale S38 in Fig. 22, respectively, on the appearing size dial 24 shown in Figs. 4 and 7.

By turning the knob 21 and with it the cord disk 22, the cord 25 moves the driver 28. The motion of the driver is through the pawl lever 36, with which it is caught, transmitted to the sides indicator 35 and the guide bar 34, and with the latter to the gliders 43, 44, 46, the center of which is pivot axis 47. The glider 44 moving in groove 17a directs axis 47. The glider 43 pivoting on the axis 47 and sliding in slot 38b, changes the angle formed by the slot 38b with the slot 17a. This change is registered by the toothed part of sector 38 which meshes with pinion 39, to which the dial 24 is fastened. The knob 21 is, therefore, turned till the designation 0.5 0/00 on its dial scale coincides with the index line on the glass covering the aperture 2b.

It is understood that in a telescope or similar optic a collimation plate, bearing graduations or concentric measuring circles or any such indicia, can be inserted and fixed in any desired position with regard to the focus of the lenses of said optic. The light rays, piercing the collimation plate, produce a picture of the observed object and the size of that picture, herein known as appearing size Eg, can be measured by means of said indicia of the collimation plate. Naturally the appearing size depends upon the actual size of the object and the distance thereof from the observation point. Whereas, the distance between the focus of the optic lenses and the collimation plate is constant and therefore serves and is known as the comparative unit C with which the measured appearing size Eg forms a ratio which is identical with the ratio between the size of the object Og and its distance from the observation point. Since the dimension of the object is known, it is apparent that by means of the above-mentioned predetermined ratio the actual distance of said object from the observation point can be computed.

In Fig. 22 the appearing size Eg and the comparative unit C are shown for explanation of the principle only, and it is easily conceivable that the position of scale S38, which is in the instrument the means to control the position of dial 24, is graduated to indicate the angular position of the slot 38b with slot 17a. It is also clear that if the size of object, that is the distance Og, is reduced, the point 47 has to be moved to the right in order to maintain the angular position, i. e. to maintain the same appearing size Eg. Thus in the above described procedure the distance from the viewpoint to the plane has been established. This distance is in diagram Fig. 22 characterized as D17a.

The comparative unit in the example is =1.
The tan of the angle formed by slot 38b with 17a is=

$$\tan \alpha = \frac{\text{appearing size } Eg}{\text{comparative unit } C} = \frac{0.5 \ 0/00}{1} = \frac{0.5}{1000 \times 1} = 0.0005$$

The distance from viewpoint A47 to the plane Og is $$D17 = \frac{\text{actual size of object } Og}{\tan \alpha} = \frac{49.21}{0.0005} = 98,420 \text{ feet}$$

By turning the knob 49 and with it dial 50 until the graduation of the dial denoting the vertical angle of view, i. e. the angle at which the theodolite optic is inclined during the observation, is brought under the index line on the glass covering aperture 2c. This angle is assumed to be 16 artillery mils which equals 9°. The knob motion is transmitted through pinion 51 to the sector 55, and the parallelogram arms 56 and 57 are accordingly swung on pivots 54 and 58. Sides indicator 35 with height scale 62 have followed this movement, the spring clamps 61, having tightened their grip on the arms 56 and 57, keep the sides indicator parallel to the pivot points 54 and 58.

Referring to the diagram Fig. 21, this movement of the parts forming the parallelogram A54—B60—b60—a58 with the extension H62 (sides indicator 35 with height scale 62) into the position shown in dotted lines illustrates that where extension 62 intersects the scale 68, the foreshortened distancer D68 designating the horizontal distance (in miles) from the viewpoint to object is read. The scale of the extension 62 is read where it intersects index line 2e, and this data indicates the altitude (in feet) H62 from the horizontal or view level to the plane in the air. All the scales are indexed in the same basic scale in which the apparatus is designed (for example 1:250,000) and are accordingly a reduced replica of the actual measures. Distance D56 is identical with the distance D17a of the diagram Fig. 22. The triangle A54—O—C is the reduced replica of the triangle formed by imaginary lines from the point of view to the object (aircraft) and from the object to the view level and back to the point of view.

Mathematically the horizontal distance is ascertained in the formula:

D68 = distance D56 × cos α = D56 × cos 9°
98,420 × 0.98769 = 97,208 feet ≑ 18.4 miles.

The altitude is:

H62 = distance D56 × sin 9°
98,420 × 0.15643 = 15,395 ≑ 15,500 feet.

The aircraft is 18.4 miles distant and flies at an altitude of 15,500 feet.

Since it would be a practical impossibility to utilize in any calculation instrument angles so small as those enclosed by the two imaginary lines drawn from the point of view (point of observation) to the extremities of a far distant object (aircraft), the actual size of the object is enlarged to render a useful angle. So is for instance in the construction of the apparatus as described before, the actual size Og enlarged 100 times. This enlargement, without which the calculating apparatus would not be practical, is compensated for by the corresponding arrangement of the graduations of the appearing size dial scale 24.

I claim as my invention:

1. Apparatus for quickly determining mechanically the distance of an object of known dimensions from an observation point from the predetermined appearing size of one of said known dimensions comprising a casing, a frame movably mounted on said casing, means for adjusting said frame rectilinearly with respect to said casing to a position corresponding to the known dimension of the object, said frame having a guide extending at right angles to direction of said rectilinear adjustment, a bar extending at right angles to the direction of said guide, a glider connected with said bar and contacting with said guide to be guided thereby, means for adjusting the glider and bar laterally to a position corresponding to the ratio of the known dimension to the predetermined appearing size of said dimension, means for indicating the ratio represented by the position of adjustment of said bar, means for retaining the direction of extent of said bar always parallel to the direction of rectilinear adjustment of the frame and parallel to its original direction of extent, and means for indicating the adjusted position of said bar in units denoting the distance of the object from the observation point.

2. Apparatus for quickly determining mechanically the distance of an object of known dimensions from an observation point from the predetermined appearing size of one of said known dimensions comprising a casing, said casing having longitudinally extending parallel guides, a frame mounted in said casing and having guide followers contacting with the said casing guides, whereby said frame is guided for longitudinal movement in said casing, a rack, a pinion mounted rotatably in said casing and meshing with said rack, a lever pivoted in the casing and operatively connected with said rack, said lever being drivingly connected intermediate its ends with said frame, means for turning said pinion to adjust the frame longitudinally of the casing to a position corresponding to the known dimension of the object, said frame having a guide extending at right angles to direction of said rectilinear adjustment, a bar extending at right angles to the direction of said guide, a glider connected with said bar and contacting with said guide to be guided thereby, means for adjusting the glider and bar laterally to a position corresponding to the ratio of the known dimension to the predetermined appearing size of said dimension, means for indicating the ratio represented by the position of adjustment of said bar, means for retaining the direction of extent of said bar always parallel to the direction of rectilinear adjustment of the frame and parallel to its original direction of extent, and means for indicating the adjusted position of said bar in units denoting the distance of the object from the observation point.

3. An apparatus as set forth in claim 1, in which the means for adjusting the frame rectilinearly with respect to said casing comprises a dial bearing graduations representing units of linear measure, said casing having an index by which the position of said dial may be read off of the said graduations of said dial, said position of the dial representing the known dimension of an object.

4. An apparatus as set forth in claim 1, in which the means for adjusting the frame rectilinearly with respect to said casing comprises a dial bearing graduations representing units of linear measure, said casing having an index by which the position of said dial may be read off of the said graduations of said dial, said position of the dial representing the known dimension of an object, said dial having a circular recess, a denomination ring fitted into said circular recess and being exchangeable, said denomination ring bearing indicia denoting the dimensions of objects, a knob to adjust said dial with said denomination ring by which said indicia on said denomination ring may be brought to coincide with said index on said casing.

5. In an apparatus of the class described, a casing, a frame, means for adjusting same frame in rectilinear direction with respect to said casing, a guide on said frame extending at right angles to the direction of said rectilinear adjustment of said frame, a glider guided by said guide, a bar having its longitudinal axis positioned at right angles to said guide, said guide being connected with said glider, means for moving said bar in the direction of said guide, means for indicating the lateral position of said bar, said position denoting the ratio of a known dimension of an object to the predetermined appearing size of said dimension.

6. A dial bearing graduations denoting units of measure, means for adjusting said dial, a frame having a transverse guide means for transmitting said adjustment to said frame and transverse guide, said adjustment representing a proportionally augmented known dimension of an object, a member to which the motion caused by said adjustment is transferred, a second dial in connection with said member, said dial bearing graduated indicia representing the appearing size or encompassing angle of said dimension of said object, the arrangement of said indicia compensating for the augmentation of said known dimension.

7. Apparatus for quickly determining mechanically the distance of an object of known dimensions from an observation point from the predetermined appearing size of one of said known dimensions comprising a casing, a frame movably mounted on said casing, means for adjusting said frame rectilinearly with respect to said casing to a position corresponding to the known dimension of the object, said frame having a guide extending at right angles to direction of said rectilinear adjustment, a guide bar extending at right angles to the direction of said guide, a first and a second glider fixed on a common axis and being connected with said bar for free movement longitudinally of the bar and tightly in the lateral direction, said gliders connecting said guide bar with said guide to be guided thereby, means for adjusting the gliders and guide bar laterally to a position corresponding to the ratio of the known dimension to the predetermined appearing size of said dimension, means for indicating the ratio represented by the position of adjustment of said guide bar and said gliders, a means for retaining the direction of extent of said bar always parallel to the direction of rectilinear adjustment of the frame and parallel to its original direction of extent, and means for indicating the adjusted position of said bar in units denoting the distance of the object from the observation point.

8. Apparatus for quickly determining mechanically the distance of an object of known dimensions from an observation point from the predetermined appearing size of one of said known dimensions comprising a casing, a frame movably mounted on said casing, means for adjusting said frame rectilinearly with respect to said casing to a position corresponding to the known dimension of the object, said frame having a guide extending at right angles to direction of said rectilinear adjustments, a bar extending at right angles to the direction of said guide, gliders fixed on a common axis and being connected with said bar for free movement longitudinally of the bar and tightly in the lateral direction, said gliders connecting with said guide to be guided thereby, means for indicating the ratio of known dimension to appearing size of the object represented by the relation of the lateral position of said bar to the longitudinal position of said frame, means for adjusting said gliders and bar laterally until the said ratio represents the known size of the dimension relative to the predetermined appearing size of the object, means for retaining the direction of extent of said bar always parallel to the direction of rectilinear adjustment of the frame and parallel to its original direction of extent, and means for indicating the adjusted position of said bar in units denoting the distance of the object from the observation point.

9. An apparatus as set forth in claim 7, and a scale bar, means for interlocking said guide bar with said scale bar so that said guide bar guides said scale bar, a driver having a recess, said scale bar having a pawl lever extending into the recess of said driver, said casing having a groove to guide said driver, a cord having its two ends fastened to said driver, guide rollers to guide said cord, a drum having a groove around which said cord is slung and to which said cord is fastened in one place, an axle fixedly connecting said drum to the second knob and forming the means to turn the drum and through said cord transmit the rotating motion of said drum to said other means to move said guide bar, said drum having a concentric groove interrupted in one place, said casing having a stop pin extending into said concentric groove of said drum, said concentric groove in cooperation with said stop pin limiting the rotating motion of said drum thus guarding said cord from being subjected to further stress when said drive has reached the end of said guide groove of said driver.

10. Apparatus as set forth in claim 7, in which the means for indicating ratio represented by the position of said guide bar and gliders comprises an indicator arm having a gear sector, said indicator arm being pivoted on one end and having a longitudinally extending slot, a third glider being journaled freely between and having a common axis with said first and second glider, the position of said gliders controlling the angular position of said indicator arm with reference to the guide of said frame, a pinion, said gear sector of said indicator arm meshing with said pinion, a dial, a bushing fixedly connecting said pinion to said dial, an axle supported in said casing and having a cord drum, said pinion and bushing and dial being rotatable on but not with the axle, said dial bearing graduations denoting the angular position of said indicator arm with said guide of said frame, said casing having an index by which to read or to which to adjust the graduations on said dial denoting the predetermined appearing size of the known dimension of an object.

11. Apparatus for quickly determining mechanically the horizontal distance and vertical interval of an object of known dimensions from an observation point from the predetermined appearing size and predetermined vertical angle of the object from the observation point comprising a casing, a frame movably mounted in said casing, means for moving said frame rectilinearly a distance proportioned to a known dimension of the object, said frame having a transversely extending glider guide slot, a scale bar extending rectangularly of the said guide slot, gliders fixed to a common axis and operatively connected to said scale bar to be moved laterally therewith, one of said gliders extending into said glider guide slot, means for moving said scale bar and gliders transversely in accordance with the ratio of the known dimension of the object to the predetermined appearing size of said known dimension of the object, means for swinging said scale bar circularly through an angle corresponding to the predetermined vertical angle of the object, means for guiding the direction of extent of said scale bar to maintain it parallel with its original direction of extent, means for indicating the position of the scale bar in units denoting the vertical interval of the object from the observation point, a distance scale graduated in units of measure, an index line on said scale bar, the position of said index line of said scale bar with reference to said distance scale denoting the horizontal distance from the observation point to the observed object.

12. An apparatus as set forth in claim 11, said means for swinging said scale bar circularly and said means for guiding the direction of extent of said scale bar comprising a first and a second pivoted arm, said first arm having a gear sector and being pivoted near the extremity adjacent said gear sector, means to swing said gear sector with said first arm circularly, said second arm being spaced with regard to the first arm and also pivoted near one end, an indicator arm journalled on a pivot and having a glider slot and a gear sector, the pivot points of said first and second arms being laterally in line with the pivot point of said indicator arm, the free ends of said first and second arms being spaced at the same distance as they are at their pivot points by a cross link having its ends pivotally fastened to said free ends of said first and second arms whereby said cross link forms a parallelogram with said first and second arms.

13. An apparatus as set forth in claim 11, said means for swinging said scale bar circularly and said means for guiding the direction of extent of said scale bar comprising a first and a second pivoted arm, said first arm having a gear sector and being pivoted near the extremity adjacent said gear sector, means to swing said gear sector with said first arm circularly, said second arm being spaced with regard to the first arm and also pivoted near one end, an indicator arm journalled on a pivot and having a glider slot and a gear sector, the pivot points of said first and second arms being laterally in line with the pivot point of said indicator arm, the free ends of said first and second arms being spaced at the same distance as they are at their pivot points by a cross link having its ends pivotally fastened to said free ends of said first and second arms whereby said cross link forms a parallelogram with said first and second arms, said scale bar being pivotally connected to said first and second arms by two grippers, said grippers being the final means to maintain said original direction of extent of said scale bar.

14. In apparatus of the class described, two parallel arms having concave grooves running longitudinally thereof, a scale bar, grippers connecting the scale bar with said arms, two rivets fixed stationarily to said scale bar, said rivets piercing said grippers with their shafts and their heads being convex and oval in shape and extending into said concave grooves, the transverse axis of said oval running in the same direction as the said concave grooves allowing said scale bar guided by said grippers to be moved laterally on said arms when said arms are in rectangular positions with regard to said scale bar, means for swinging said arms circularly causing said arms to assume an oblique position with respect to said scale bar, said altered position forcing said rivet heads to assume an oblique position with respect to said concave groove of said arms, said rivet heads slightly distorting said grippers when in said oblique position so as to grip the edges of said parallel arms, said grippers thus preventing said scale bar from moving laterally on said arms while maintaining sufficient elasticity to render the connection between said scale bar and said arms pivotally movable.

15. Apparatus as set forth in claim 11, the means for swinging said scale bar circularly including a pair of parallel pivoted arms to which said bar is connected at points equally spaced from the pivots thereof, said scale bar having two hooks, a guide bar having two notches having a form and being positioned to be engaged by the hooks when said scale bar is right angularly positioned with respect to said parallel arms, said guide bar acting as a guide to guide said scale bar to maintain the same direction of extent of said scale bar while said scale bar is in said initial position or is moved laterally, a pawl connecting the scale bar with the means for moving said scale bar laterally, said hooks and notches being shaped to permit disengagement of said hooks and therewith said scale bar from said notches of said guide bar when said scale bar is swung from said initial position and to reengage said hooks with said notches when said scale bar is swung back into said initial position.

16. Apparatus as set forth in claim 11, said scale bar having a plate mounted and guided thereon, said plate bearing graduations denoting units of measure, and means accessible from the outside of said casing for adjusting said plate on said scale bar.

17. Apparatus as set forth in claim 11, said scale bar having a plate mounted thereon, said plate bearing graduations and a longitudinally extending index line, said casing having a laterally extending scale marked thereon graduated in units of measure and an index, the longitudinal position of said scale bar being indicated by said index on said casing by means of the graduations on said plate, the longitudinal position denoting vertical interval of the object from the observation point, said index line on said plate indicating the lateral position of said scale bar on said lateral scale on said casing, said indication of said lateral position of said scale bar denoting the horizontal distance of the object from the observation point.

18. Apparatus as set forth in claim 11, said means for swinging said scale bar circularly through an angle comprising a pivoted link having a gear sector, a pinion meshing with said gear sector, an axle on which said pinion is fixedly mounted, a knob fixed on said axle, said axle being rotatably supported in said casing and having a stop and a dial fixedly mounted thereon, said casing having a stop pin, said stop pin interrupting the circular motion of said stop thus limiting also the circular motion of said dial, said dial bearing graduations, an index on said casing for indicating the position of said dial by said graduations, said position governing the angular position of the arm with which said scale bar is connected and said position denoting the predetermined vertical angle of the object, said dial being adjusted to said position denoting said vertical angle by means of said knob.

19. Apparatus as set forth in claim 11, in which the casing is provided with a driver guide groove extending transversely thereof, the means for moving said scale bar transversely comprising a laterally movable driver guided in said driver guide groove, means for moving said driver, a recess in said driver, said driver tapering off from said recess toward both ends thereof thus forming cam surfaces, the scale bar having a recess, a pawl lever movably housed in said bar recess, said pawl lever having a nose, a cam and a slot, said slot being situated near the end opposite the nose, a pin mounted in said scale bar and piercing said slot and spanning said scale bar recess to pivot and guide said pawl lever, a second pin held in the same manner as the first and engaging said cam of said pawl lever, said nose of said pawl lever being in position to extend into said recess of said driver when said scale bar is in its initial position, a spring to depress said pawl lever, said first and second pins being arranged to lift said pawl lever nose clear from said driver when said scale bar is swung circularly through an angle, said pawl lever first being engaged with its nose in the recess of said driver and being thus retained at the start of said circular motion, said first pin at the primary stage of said motion sliding in said slot of said pawl lever, while said second pin mounts said cam of said pawl lever thus lifting the nose clear of said driver recess and disengaging the connection of said scale bar with said driver, a guide bar having a recess into which said pawl lever nose moves when said scale bar is being swung reversely in said circular motion to be returned to said initial position, said guide bar recess offering resistance to said pawl lever, thus causing said second pin to descend the pawl lever cam just before said scale bar is completely returned to its initial position so that the spring again presses the pawl lever nose outwardly from the recess of the scale bar, said driver continuing to move toward its initial position after return of the scale bar, whereby the driver cam surface engages the pawl lever nose and raises the nose until it snaps into the driver recess and thus reestablishes connection between the scale bar and driver.

FRITZ A. HUG.